United States Patent
Laskaska et al.

(10) Patent No.: US 12,320,415 B2
(45) Date of Patent: Jun. 3, 2025

(54) MULTI-AXIS GEAR PILOTING CARRIER FOR ELECTRIC DRIVE UNIT

(71) Applicant: GM GLOBAL TECHNOLOGY OPERATIONS LLC, Detroit, MI (US)

(72) Inventors: Matthew James Laskaska, Essexville, MI (US); Chi Teck Lee, Novi, MI (US); James M Hart, Belleville, MI (US); Christopher Michael Kaminski, Royal Oak, MI (US); Randal W Arndt, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 18/359,404

(22) Filed: Jul. 26, 2023

(65) Prior Publication Data

US 2025/0035205 A1  Jan. 30, 2025

(51) Int. Cl.
| | | |
|---|---|---|
| *F16H 57/021* | (2012.01) | |
| *F16H 57/023* | (2012.01) | |
| *F16H 57/00* | (2012.01) | |
| *F16H 57/02* | (2012.01) | |

(52) U.S. Cl.
CPC ......... *F16H 57/021* (2013.01); *F16H 57/023* (2013.01); *F16H 2057/0062* (2013.01); *F16H 2057/02043* (2013.01)

(58) Field of Classification Search
CPC ................ F16H 57/021; F16H 57/023; F16H 2057/0062; F16H 2057/02043
See application file for complete search history.

(56) References Cited

U.S. PATENT DOCUMENTS

| | | | | |
|---|---|---|---|---|
| 2,199,993 | A * | 5/1940 | Hale | F16H 61/0262 477/121 |
| 3,001,409 | A | 9/1961 | VonFumetti | |
| 4,282,767 | A * | 8/1981 | Guichard | F16H 1/225 74/427 |
| 4,594,911 | A * | 6/1986 | Hofmann | F16H 1/20 74/606 R |
| 4,924,689 | A * | 5/1990 | Wilson | B21B 35/12 72/235 |
| 8,844,669 | B2 * | 9/2014 | Armfield | B60B 35/122 180/371 |
| 11,499,615 | B2 * | 11/2022 | Lee | B60K 1/00 |
| 12,240,318 | B2 * | 3/2025 | Pultz | B60K 17/043 |
| 2013/0247717 | A1 * | 9/2013 | Hadwani | A01D 41/12 74/665 G |

(Continued)

FOREIGN PATENT DOCUMENTS

| | | |
|---|---|---|
| CN | 201118356 Y | 9/2008 |
| CN | 111927925 A | 11/2020 |

(Continued)

OTHER PUBLICATIONS

U.S. Appl. No. 18/305,132, Compact Electric Drive Units and Vehicles, filed Apr. 21, 2023.

*Primary Examiner* — Thomas C Diaz
(74) *Attorney, Agent, or Firm* — Lorenz & Kopf LLP

(57) ABSTRACT

A product including a carrier having piloting features for assembling multiple gear drives for use in an electric drive unit of a vehicle. A method of assembling a portion of an electric drive unit utilizing a gear piloting carrier having piloting features for assembling multiple gear drives.

19 Claims, 13 Drawing Sheets

(56) References Cited

U.S. PATENT DOCUMENTS

2016/0099632 A1  4/2016  Rawlinson
2022/0099168 A1* 3/2022  Lee ........................ B64C 27/00

FOREIGN PATENT DOCUMENTS

| CN | 113251110 A | 8/2021 |
|---|---|---|
| DE | 2533611 A1 | 6/1976 |
| DE | 19827583 A1 | 12/1999 |
| DE | 102011053494 A1 | 3/2013 |
| DE | 102015010101 A1 | 2/2017 |
| DE | 102017218022 A1 | 4/2019 |
| DE | 102021213292 A1 | 5/2023 |

* cited by examiner

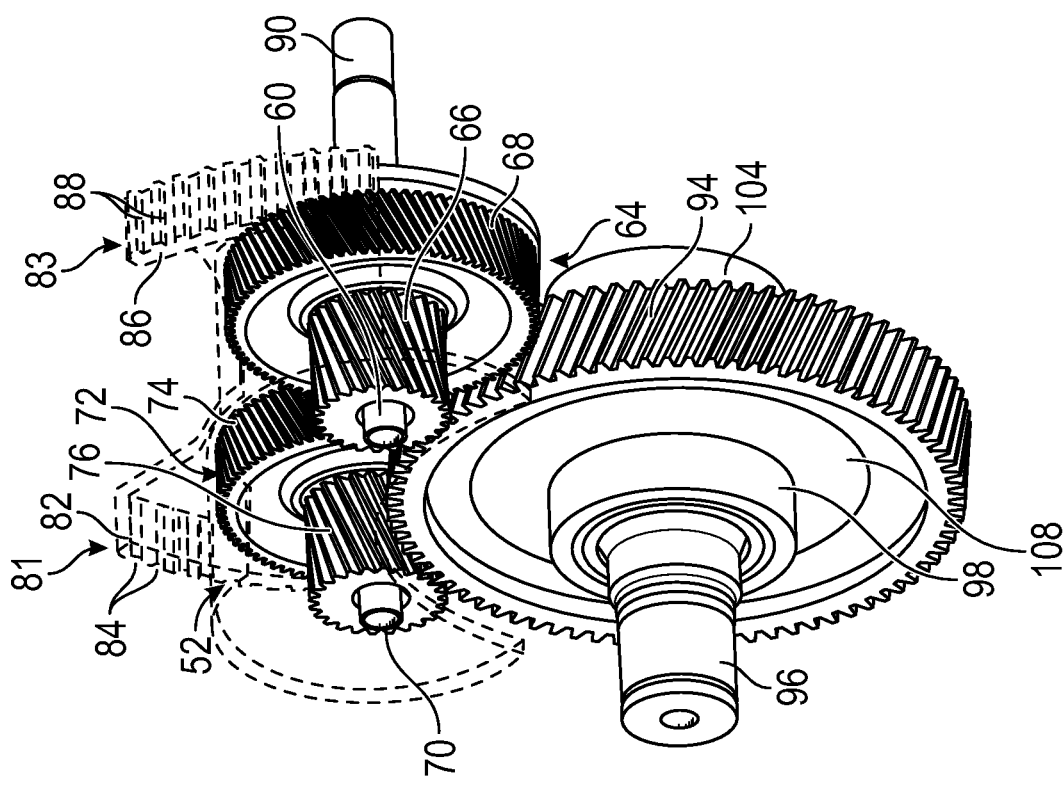
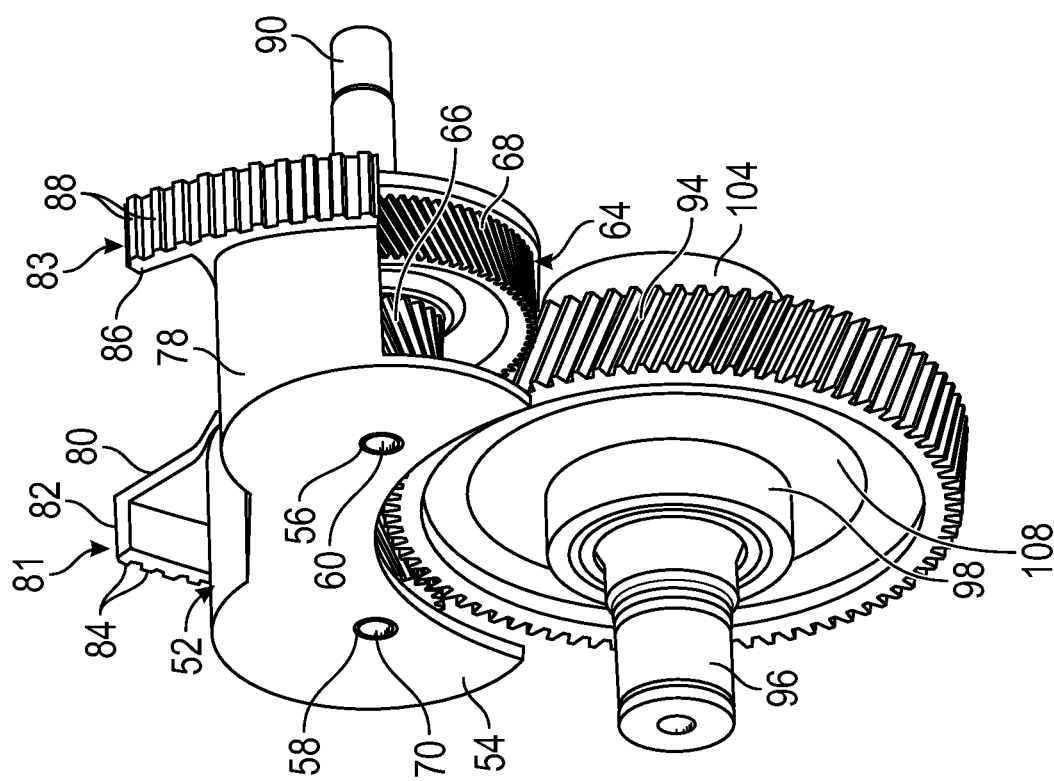
FIG. 3B
FIG. 3A

MULTI-AXIS GEAR PILOTING CARRIER FOR ELECTRIC DRIVE UNIT

INTRODUCTION

The technical field generally relates to electric drive units for vehicles, components thereof, and methods of assembling.

Electric drive units for vehicles have many components which makes assembly thereof challenging.

Accordingly, it is desirable to provide an electric drive unit and components thereof that may be assembled in a manner with greater accuracy. Furthermore, other desirable features and characteristics of the variations disclosed herein will become apparent from the subsequent detailed description and the appended claims, taken in conjunction with the accompanying drawings and the foregoing.

SUMMARY

A number of variations may include a product which may include a carrier having piloting features for assembling multiple gear drives for use in an electric drive unit of a vehicle.

A number of variations may include a method of assembling a portion of an electric drive unit utilizing a gear piloting carrier having piloting features for assembling multiple gear drives.

BRIEF DESCRIPTION OF THE DRAWINGS

The exemplary embodiments will hereinafter be described in conjunction with the following drawing figures, wherein like numerals denote like elements, and wherein:

FIG. 3A is a front perspective view showing a carrier according to a number of variations;

FIG. 3B is a front perspective view showing a carrier with portions shown with phantom lines to show internal components according to a number of variations;

DETAILED DESCRIPTION

The following detailed description is merely illustrative in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
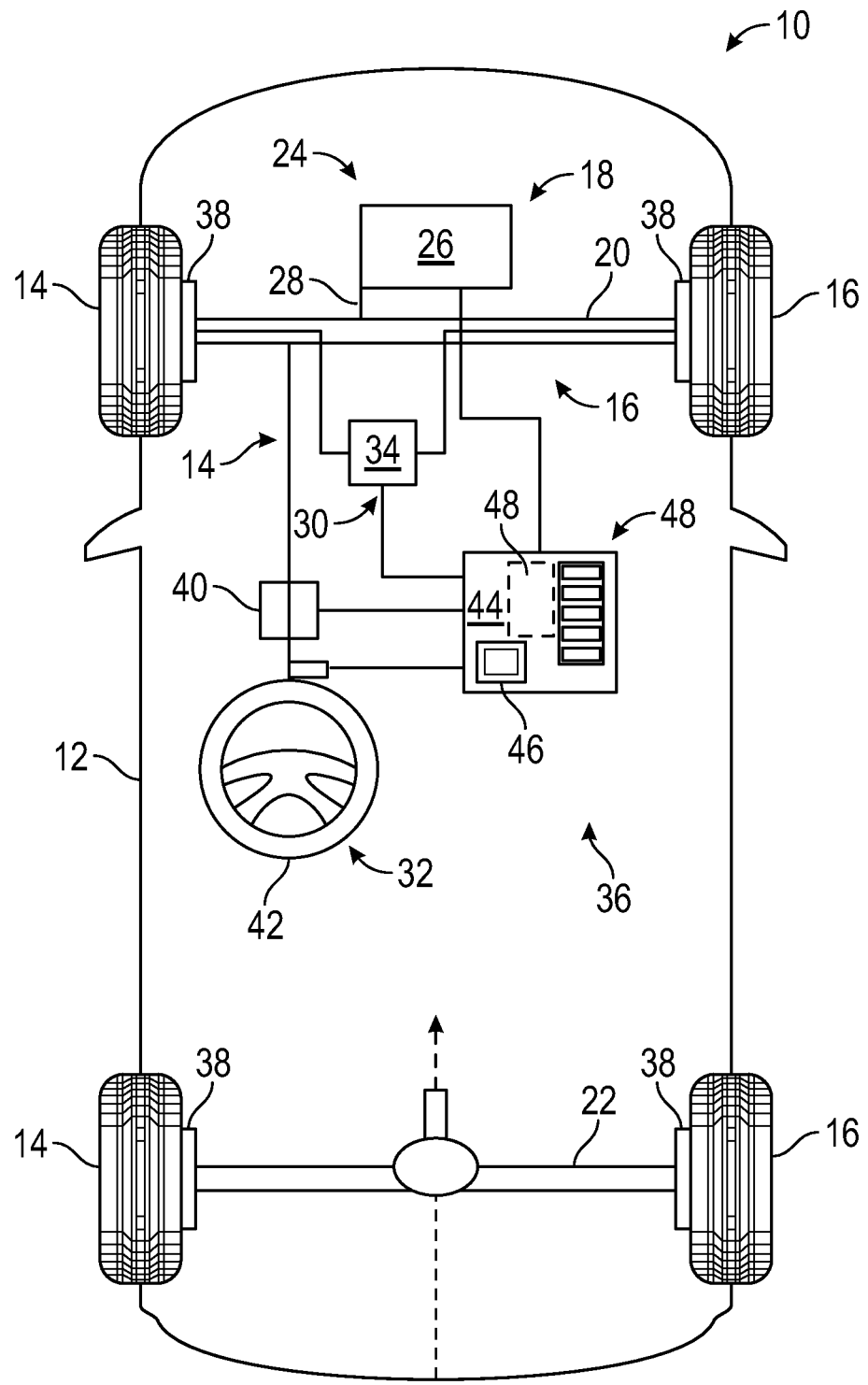
FIG. 1 is a functional block diagram of a vehicle, in accordance with a number of variations.

FIG. 1 illustrates a number of variations of a vehicle 10 in functional block diagram form. In a number of variations, the vehicle 10 may be an automobile. The vehicle 10 may be any one of a number of different types of vehicles, for example but not limited, a sedan, a wagon, a van, a truck, or a sport utility vehicle (SUV), and may be two-wheel drive, for example, rear wheel drive or front wheel drive, a four wheel drive or all-wheel drive, and/or various other types of vehicles in certain variations. In certain variations, the vehicle 10 may also include another type of mobile platform.

The vehicle 10 may include a body 12 that may be arranged on or integrated with a chassis. The body 12 may substantially enclose other components of the vehicle 10. The vehicle 10 may also include a plurality of wheels 14 and 16, which may be referred to as left or driver side wheels 14, and right or passenger side wheels 16. The wheels 14 and 16 may be each rotatably coupled to the chassis near the respective corners of the body 12 to facilitate movement of the vehicle 10. In a number of variations, the vehicle 10 may include four wheels 14 and 16, although this may vary in other variations, for example, for trucks and certain other vehicles.

A drive system 18 may be mounted in the vehicle 10 to drive the wheels 14 and 16, for example via axles 20, 22. In certain variations, the drive system 18 may include a drive unit 24. In certain variations, the drive unit 24 may include a power plant 26, such as an internal combustion engine and/or electric motor/generator, which is coupled with a transmission system 28. In a number of variations, the power plant 26 may be an electric motor which may also be configured as an electric generator. In a number of variations, the drive unit 24 may vary, and/or two or more drive unit systems 24 may be utilized in the vehicle. By way of example, the vehicle 10 may also incorporate any one of, or combination of, a number of different types of drive units 24, such as, for example, a combustion/electric motor hybrid engine.

The vehicle 10 may also include a braking system 30 and a steering system 32. In a number of variations, the braking system 30 controls braking of the vehicle 10 using a brake actuator 34 that may be controlled via inputs provided by the driver, such as through a brake pedal coupled to the brake actuator 34, and in a number of variations, via automatic control by a control system 36. The braking system 30 may include brakes, such as brake 38, at any of a number of the wheels 14 and 16. In a number of variations, the steering system 32 controls steering the vehicle 10 via a steering actuator 40, such as with inputs from a steering wheel 42 (for example, in connection with a steering column coupled to axle 20 and/or wheels 14 and 16), that are controlled via inputs provided by the driver, and in certain variations via automatic control via the controller system 36.

In a number of variations, the control system 36 may be coupled with various systems including the braking system 30 and the steering system 32 of the vehicle 10. In a number of variations, the control system 36 may also be coupled to one or more other systems and/or components of the vehicle 10 including, for example controller 44. The controller 44, and the powertrain controller 46, may be a part of or include a computer system 47. The controller 44 may otherwise differ from the variation shown in FIG. 1. The controller 44 may be configured as any number of controllers and/or microcontrollers in communication with each other.

The controller 44 may be coupled with various actuators including actuators 34, 40 and drive unit 24. The controller 44 may also be coupled with various sensors that sense observable conditions of the vehicle 10. In a number of variations, the sensing devices may include, but not limited to, a braking sensor such as a pedal position sensor, a steering angle sensor, an acceleration sensor, and a torque request sensor, such as at the accelerator pedal or throttle.

In a number of variations, the controller 44 may be coupled to other devices, the sensors, the brake system 30, the steering system 32, the drive unit 24 and/or other systems command devices, or components of the vehicle 10.

The controller 44 may provide the drive unit 24 control functions of the vehicle 10. In a number of variations, a powertrain controller 46 may be coupled in the control system 36, and in a number of variations may be included in the controller 44. In the number of variations, the powertrain module 50 may reside in, or may be included the powertrain controller 46 or the powertrain controller may be provided as a separate control unit. The powertrain controller 46 may provide the various functions of controlling the drive unit 24, such as by providing a torque command to operate the drive unit to propel the vehicle 10.

Figure 2:
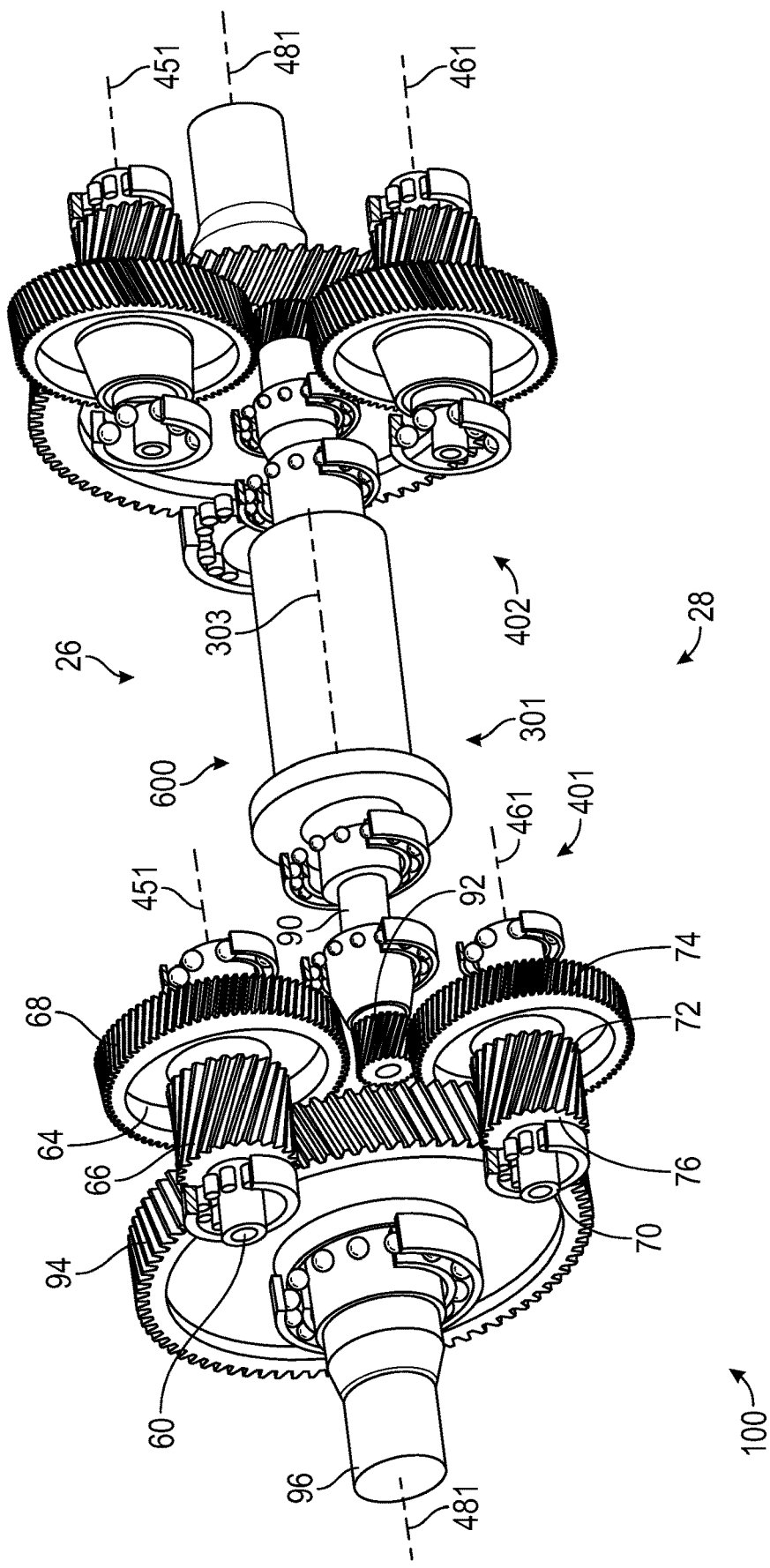
FIG. 2 this is a perspective view of an electric drive unit for a vehicle of FIG. 1, accordance with a number of variations.

FIG. 2 illustrates a number of variations, which may include a portion of a drive unit 24, a portion of power plant 26 and transmission system 28. A portion of the power plant 26 may be an electric motor configured to provide an electric motor torque and may include a rotor 301 that rotates about a rotor axis 303. The rotor 301 may be interconnected with an input differential 600 configured to selectively split the electrical motor torque into a first path 401 and a second path 402. The first path 401 extends from the input differential 600 to wheel 14, and the second path 402 extends from the input differential 600 to wheel 16.

The input differential 600 may be configured to selectively transmit torque from the rotor 301 to two pinion shafts or input drive shafts 90 that each may be configured to rotate about the rotor axis 303. Further, the input drive shaft 90 may be configured to rotate a pinion gear 92. Each pinion gear 92 may be mounted on a respective input drive shaft 90. The pinion gear 92 may be configured to rotate about the rotor axis 303. Details of various arrangements of gears and alignment thereof are described hereafter.

Each pinion gear 92 may be configured to transmit torque to two parallel transfer gear sets 64 and 72, which may be referred to as a first transfer gear set 64 and a second transfer gear set 72. In a number of variations, each first transfer gear set 64 may rotate about a rear axis 451 and each second transfer gear set 72 may rotate about a front axis 461.

Each first transfer gear set 64 may include a first transfer shaft 60, a large gear member 68, and a small gear member 66. In a number of variations, the large gear member 68 may be formed on or mounted on the respective first transfer shaft 60. In a number of variations, each small gear member 66 may be formed on or mounted to the respective gear shaft 60. As a result, each first transfer shaft 60, large gear member 68, and small gear member 66 rotate may about the rear axis 451.

Each second transfer gear set 72 may include a second transfer shaft 70, a large gear member 74, and a small gear member 76. In a number of variations, each large gear member 74 may be formed on or mounted to the respective second transfer shaft 70. In a number of variations, each small gear member 76 may be formed on or mounted to the respective second transfer shaft 70. As a result, each second transfer shaft 70, large gear member 74, and small gear member 76 may rotate about front axis 461.

Each pair of parallel transfer gear sets 64 and 72 may be configured to transmit torque to a respective final drive gear 94. Each final drive gear 94 may be configured to rotate about a drive axis 481. Specifically, each final drive gear 94 may be coupled or mounted to a drive shaft or output shaft 96.

A number of variations are illustrated in FIGS. 3A, 3B, 3C, and 3D, which may include a carrier 52 with piloting features 56, 58. The carrier 52 may include a front or first face 54 which may include the piloting features 56, 58. A cover portion 78 may extend generally perpendicularly from the first face 54. In a number of variations, the piloting features 57 may include a first through hole 56 and a spaced apart second through hole 58 both formed in the first face 54 of the carrier. The first face 54 and the cover 78 may be constructed and arranged to enclose at least a portion of a first transfer gear set 64 and a spaced apart second transfer gear set 72, and the pinion gear 92 mounted on or formed on input or drive shaft 90 (shown in FIG. 2). The first transfer gear set 64 may include a first large gear member 68 and a first small gear member 66 both mounted on or reformed on a first transfer shaft 60. The second transfer gear set 72 may include a large gear member 74 and a small gear member 76 both mounted on a second transfer shaft 70. The first transfer gear set 64 and the second transfer gear set 72 both may be stepped gear sets. The carrier 52 may include a second face 80 which may engage a second edge of the cover 78 and the second face 80 may extend generally perpendicularly from the cover 78. In a number of variations, the second face 80 may have a first spline 81 which may include a first arc shaped flange portion 82 extending generally perpendicularly from the second face 80 and having a plurality of spaced apart teeth 84 formed on an outer surface thereof. In a number of variations, the second face 80 may have a second spline 81 which may include a second arc shaped flange portion 86 extending generally perpendicularly from the second face 80 and having a plurality of spaced apart teeth 88 formed on an outer surface thereof. A final drive gear 94 may be provided and positioned to mesh with the first small gear member 66 and the second small gear member 76. An output drive shaft 96 may be coupled to the final drive gear 94 and a first output shaft annular 98 bearing may be coupled to the output drive shaft 96.

Figure 3D:
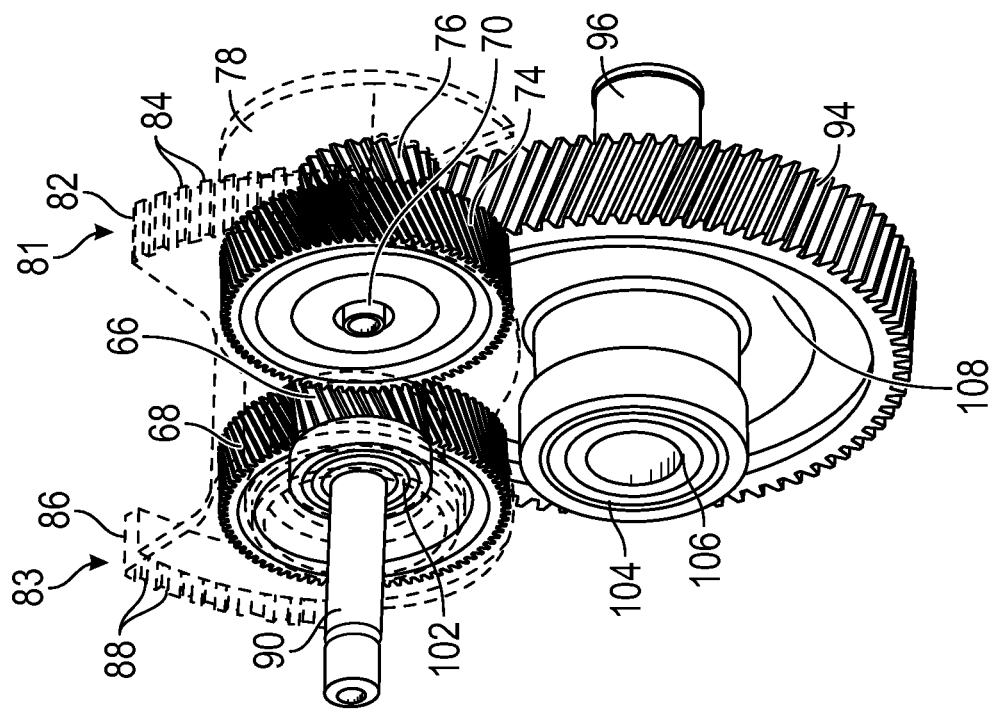
FIG. 3D is a rear perspective view showing a carrier with shown with phantom lines to show internal components according to a number of variations.
Figure 3C:
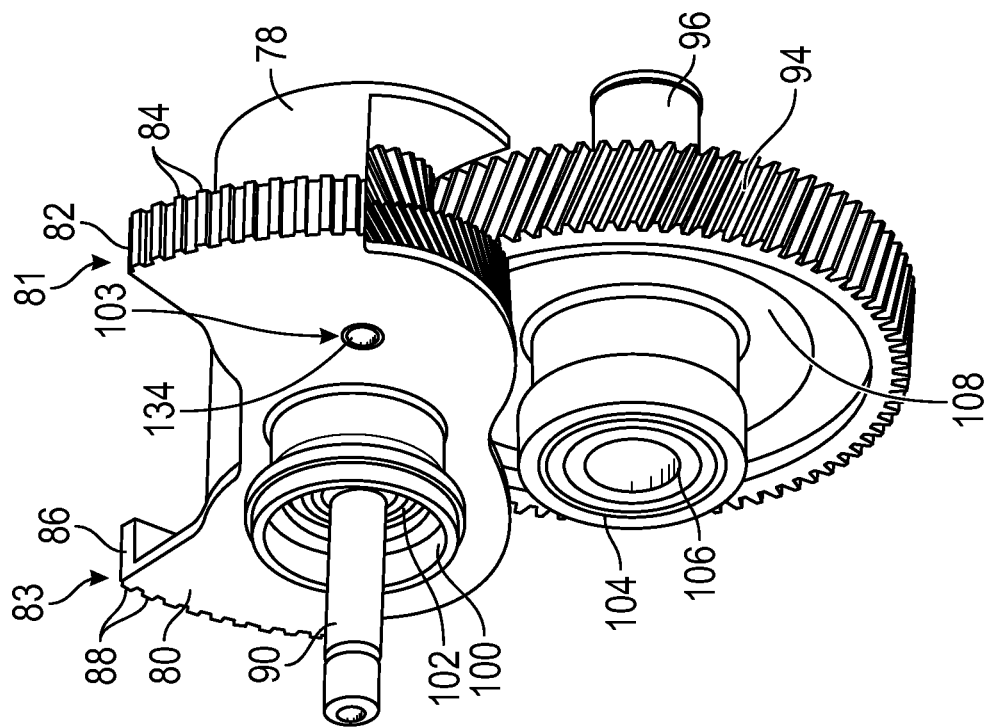
FIG. 3C is a rear perspective view showing a carrier according to a number of variations.
Figure 4B:
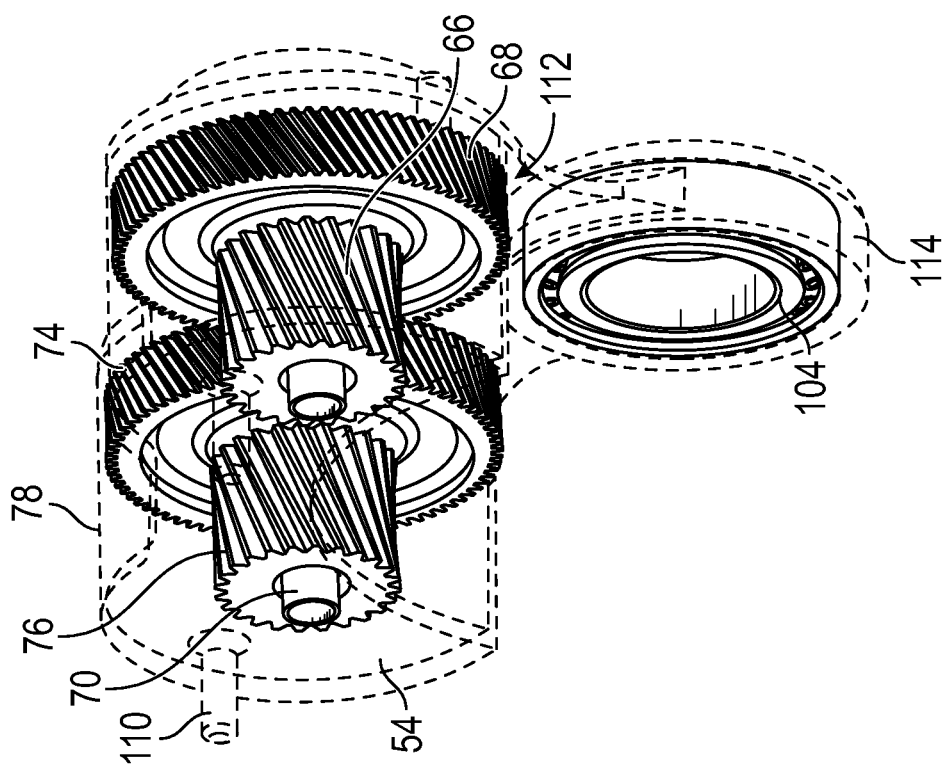
FIG. 4B is a front perspective view showing a carrier with portions and phantom lines to show internal components according to a number of variations.
Figure 4A:
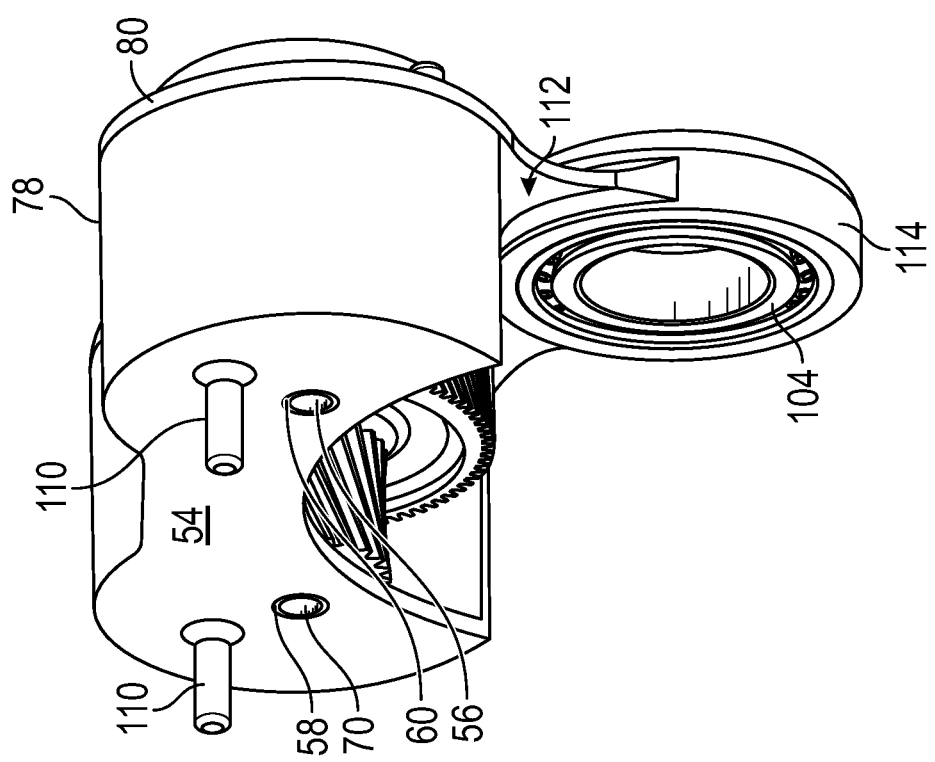
FIG. 4A is a front perspective view showing a carrier according to a number of variations.
Figure 4D:
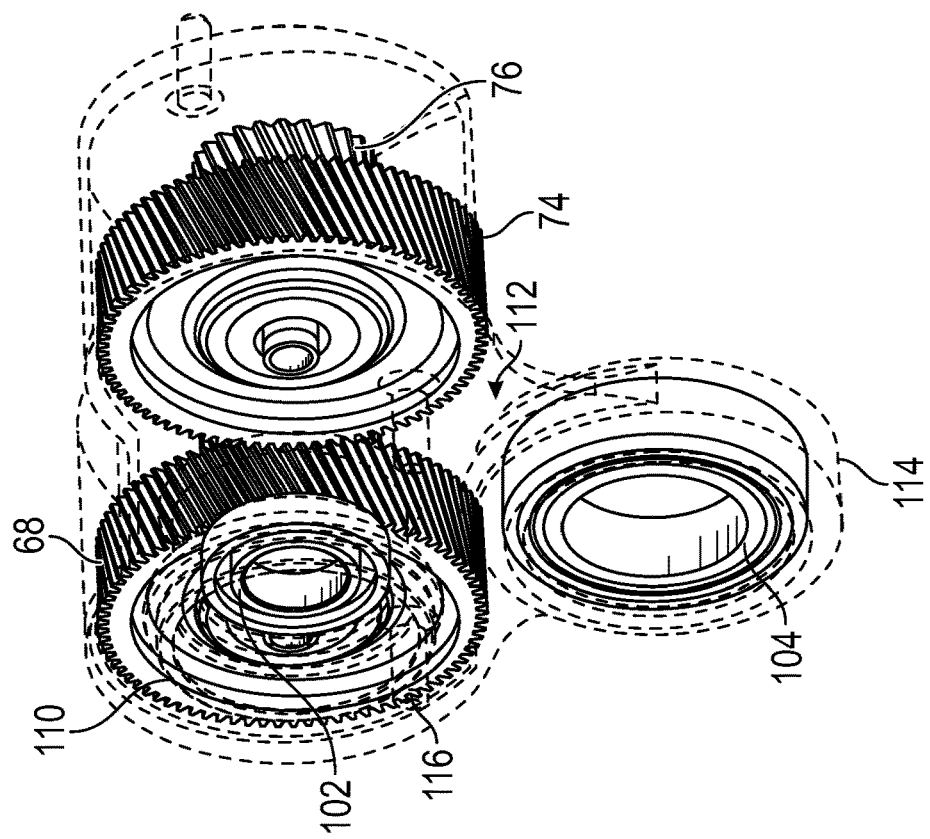
FIG. 4D is a rear perspective view showing a carrier with portions shown with phantom lines to show internal components according to a number of variations.
Figure 4C:
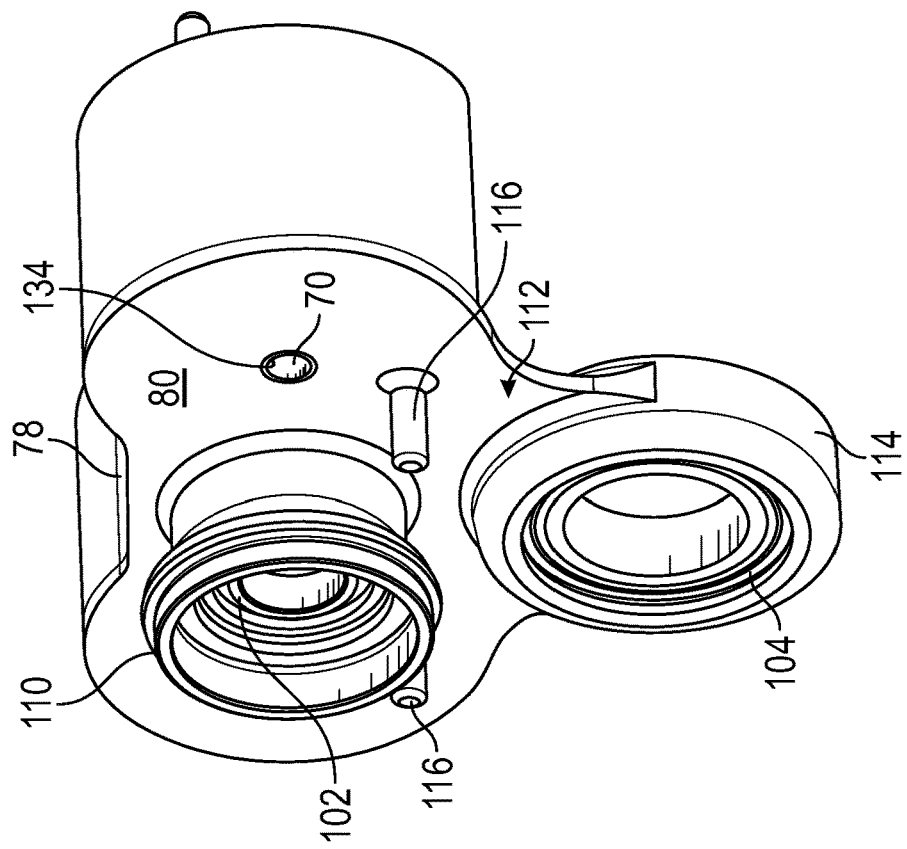
FIG. 4C is a rear perspective view showing a carrier according to a number of variations.
Figure 8:
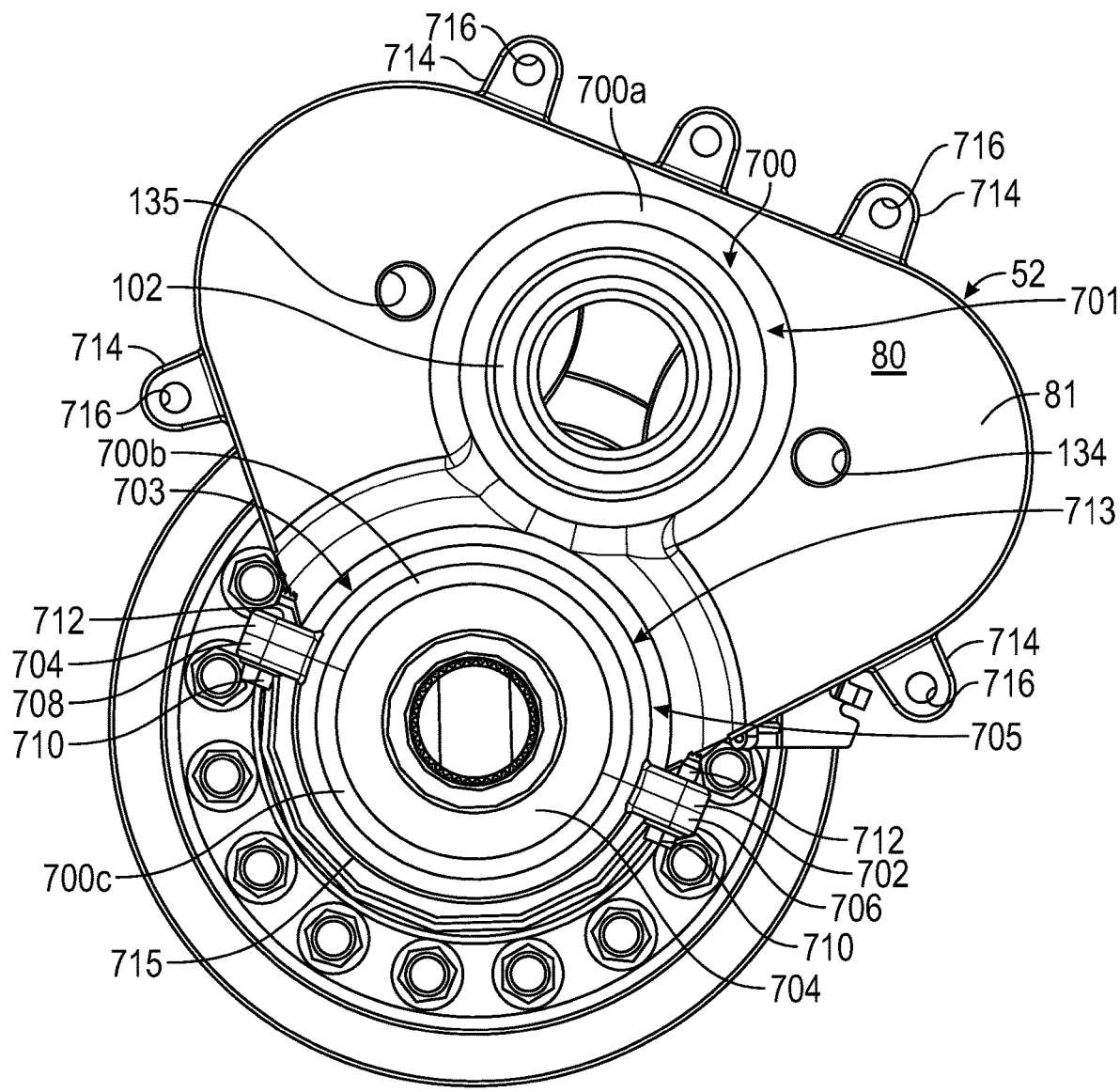
FIG. 8 is a front view showing a carrier showing a first and second bearing cap according to a number of variations.

Referring to FIGS. 3C and 3D, in a number of variations, a hollow cylindrical protrusion 100 may extend from the second face 80 of the carrier 52 and may be constructed and arranged to receive input shaft bearing 102 and a portion of the input drive shaft 90. A second output shaft bearing 104 may be coupled to an output shaft extension 106 that protrudes from an output disk 108 may carry the final drive gear 94. The carrier 52 may include a second set of piloting features 103 which may include a first through hole 135 (a variation is best seen in FIG. 8) formed in the second face 80 and a second through hole 134 formed in the second face 80. In a number of variations, the first transfer gear shaft 60 may be received in the first through hole 132 of the second face 80 and press fit into the first through hole 56 formed in the first face 54 of the carrier 52. In a number of variations, the second transfer gear shaft 70 may be received in the second through hole 134 formed in the second face 80 and press fit into the second through hole 58 formed in the first face 54 of the carrier 52. A transfer gear shaft bearing (not shown) may be provided in each of the through holes form in the first face 54 and/or each of the through holes formed in the second face 80 so that the first transfer shaft 60 and the second transfer shaft 70 may rotate on a transfer shaft bearing. Providing piloting features in at least one of the first face 52 or the second face 80 of the carrier 52 provides the advantage of being able to align the axis 451 of first transfer shaft 60, the axis 461 of the second transfer shaft 70, and the axis 303 of the input drive shaft 90 with respect to each other using the carrier. In a number of variations, axis 451 of the first transfer shaft 60, axis 461 the second transfer shaft 70, and axis 303 of the input drive shaft 90 may be aligned to be co-linear using piloting features of the carrier 52.

A number of variations are illustrated in FIGS. 4A, 4B, 4C, and 4D, which may include a carrier 52 with a first face 54 that does not include splines extending therefrom. One or more carrier locating feature 110 may be provided on at least the first face 54 which may be used to locate the carrier to a case structure and react to any unbalanced loads. In a number of variations, the one or more carrier locating features 110 may include two spaced apart elongated protrusions extending generally perpendicularly from the first face 54. The second face 80 of the carrier 52 may include an extension portion 112. The extension portion 112 may include an annular support 114. A second output shaft bearing 104 may be received in the annular bearing support 114 to support rotation of the output drive shaft 96 thereon. The second face 80 may include one or more carrier locating features 116 which may be used to locate the carrier to a case structure and react to any unbalanced loads. In a number of variations, the one or more carrier locating features 116 may include two spaced apart elongated protrusions extending generally perpendicularly from the second face 80.

Figure 5B:
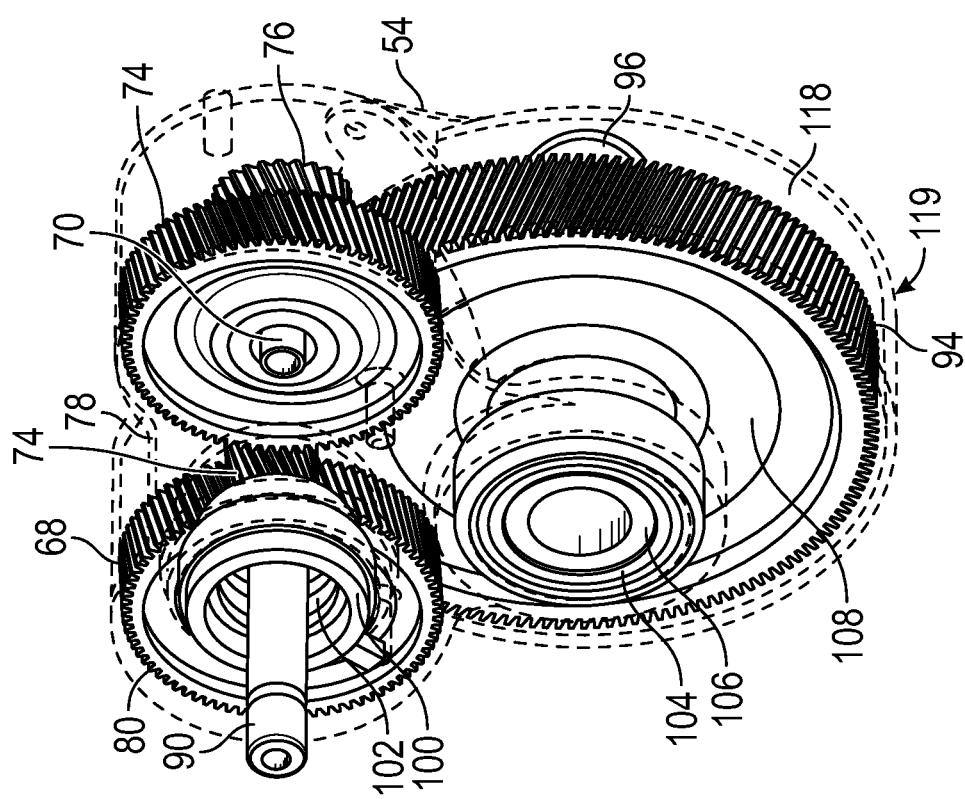
FIG. 5B is a front perspective view showing a carrier with portions shown with phantom lines to show internal components according to a number of variations.
Figure 5A:
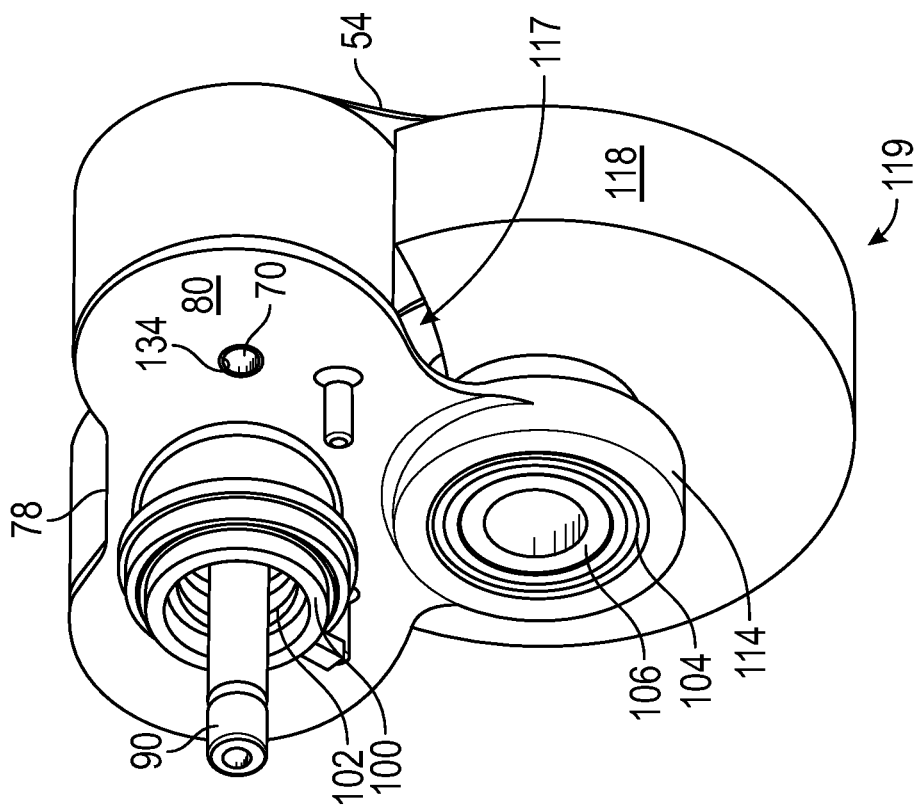
FIG. 5A is a front perspective view showing a carrier according to a number of variations.

A number of variations are illustrated in FIGS. 5A and 5B, wherein a baffle support structure 119 may be provided to enclose at least a portion of the final drive gear 94. FIGS. 5A and 5B illustrate a number of variations in which the baffle support structure 119 may be an extension of the first face 54 of the carrier 52. An opening 117 may be formed in the baffle support structure 119 to receive the final drive gear 94.

Figure 6A:
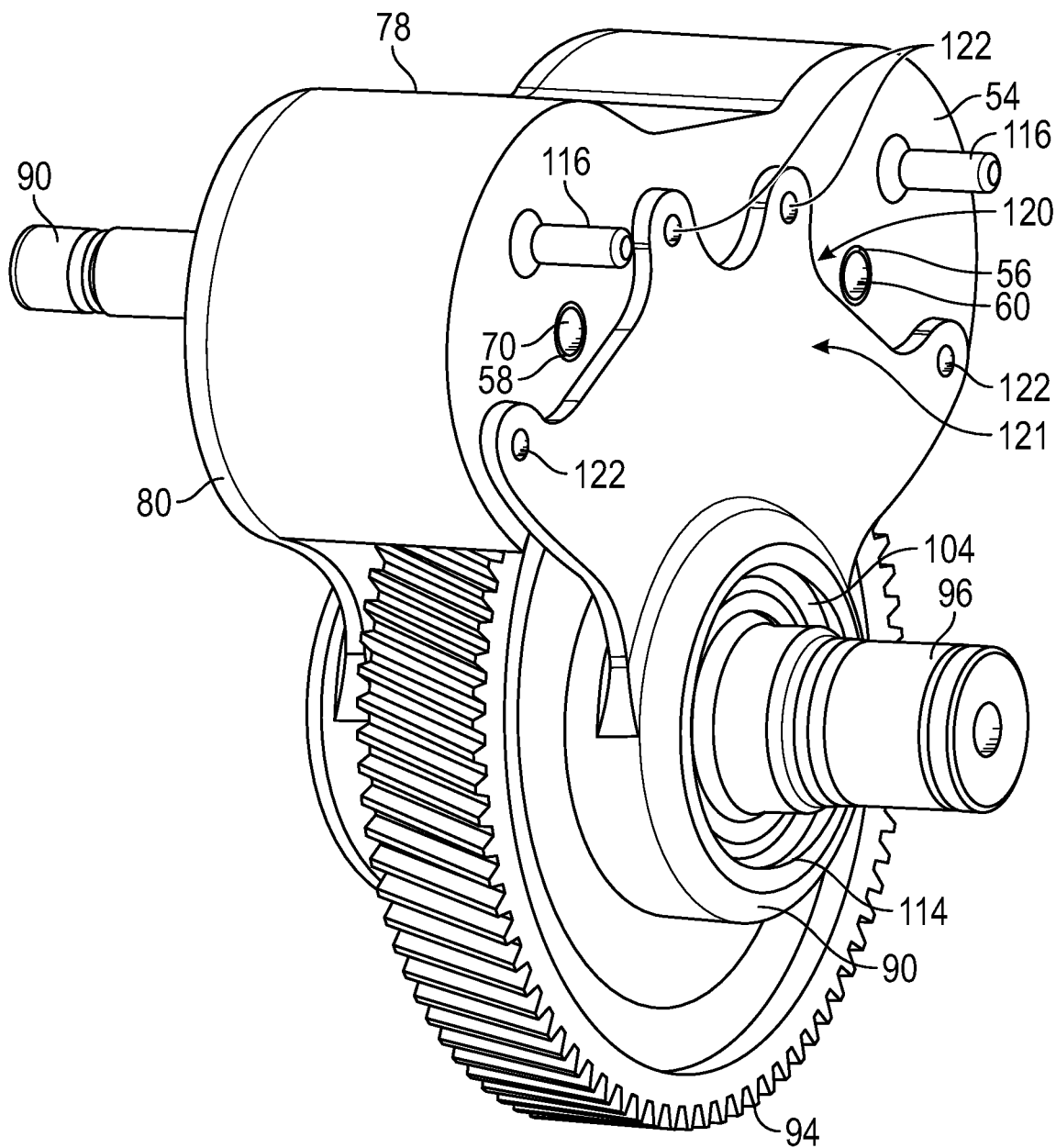
FIG. 6A is a rear perspective view showing a carrier according to a number of variations.
Figure 6C:
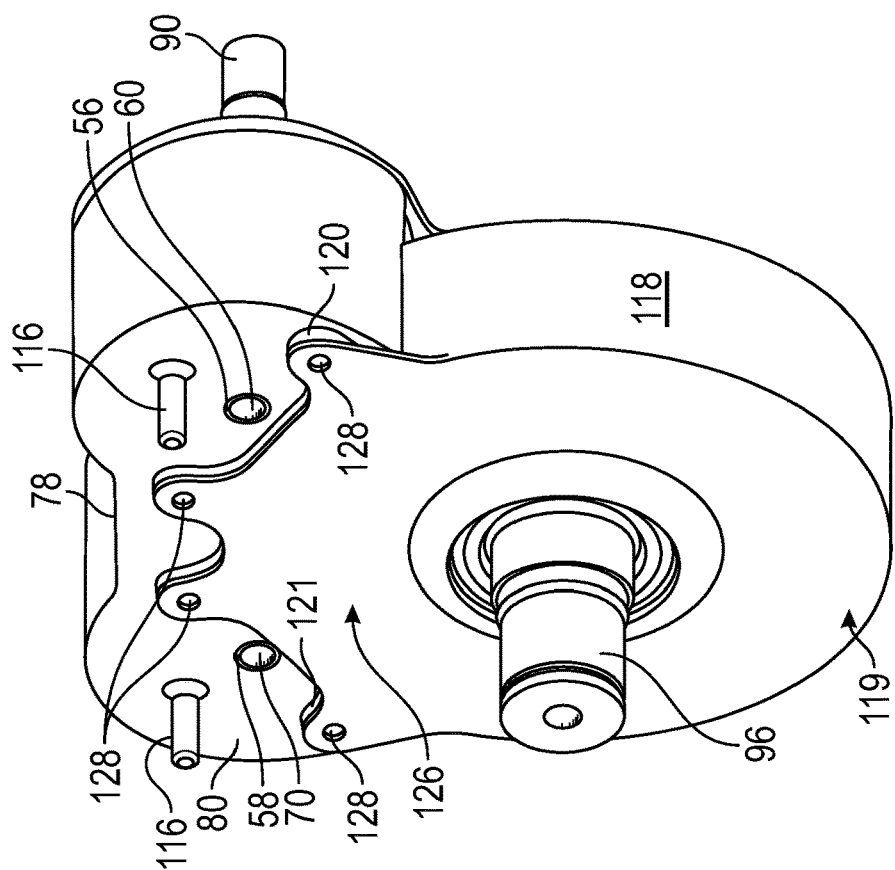
FIG. 6C is a rear perspective view showing a carrier according to a number of variations.
Figure 6B:
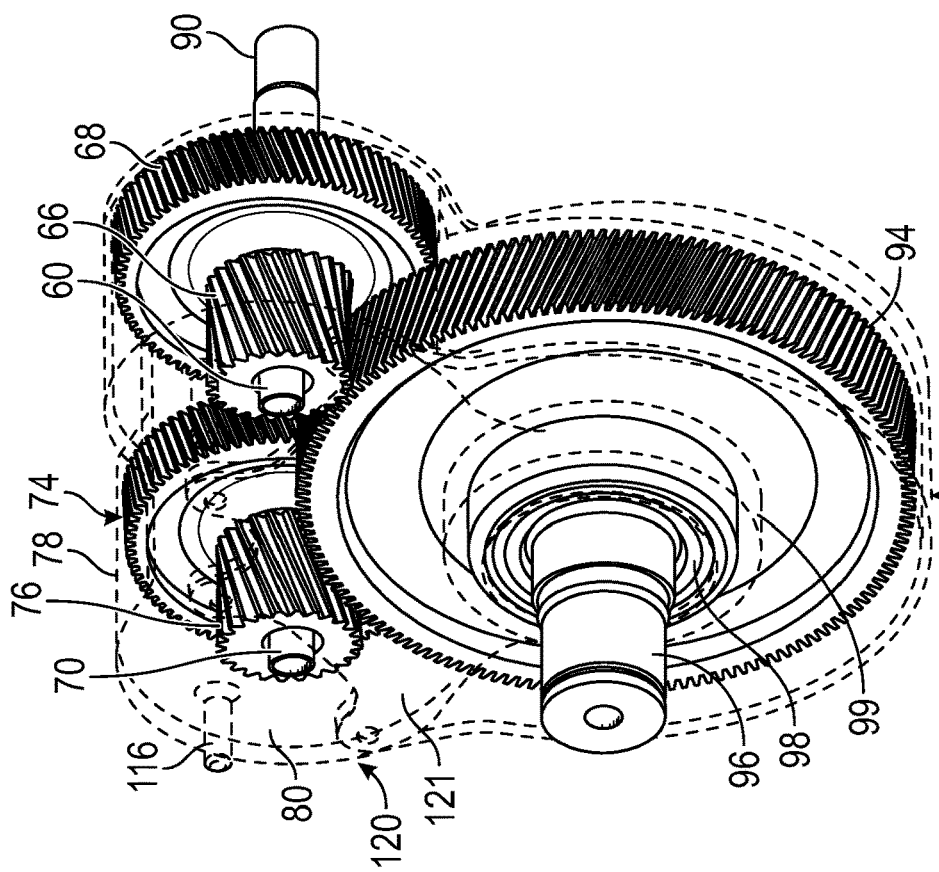
FIG. 6B is a rear perspective view showing a carrier with portions shown with phantom lines to show internal components according to a number of variations.

A number of variations are illustrated in FIGS. 6A, 6B, and 6C, wherein an output drive shaft support 120 may be bolted to the first face 54 of the carrier 52. The output drive shaft support may include a mounting flange 121 having a plurality of bolt holes 122 formed therein for attachment to the first face 54. A second annular bearing support 99 may extend downwardly from the mounting flange 121. A second output shaft bearing 98 may be received in the annular bearing support 99. The baffle support structure 119 may include a baffle mounting flange 126 having a plurality of bolt holes 128 form therein for bolting to the first face 54 of the carrier 52. The baffle support structure 119 may have a portion overlying a portion of the output drive shaft support 120. A baffle 118 may extend downwardly from the baffle mounting flange 126 of the baffle support structure 119 and may be constructed and arranged to enclose or cover at least a portion of the final drive gear 94. Corresponding bolt holes (not shown) may be formed in the first face 54 for aligning the bolt holes 122 formed in the output drive shaft support 120 and bolt holes 128 formed in the baffle support structure 119. In a number of variations, the output drive support 120 and the baffle support structure 119 may be directly or in directly attached or coupled to the first face 54 of the carrier 52.

Figure 7:
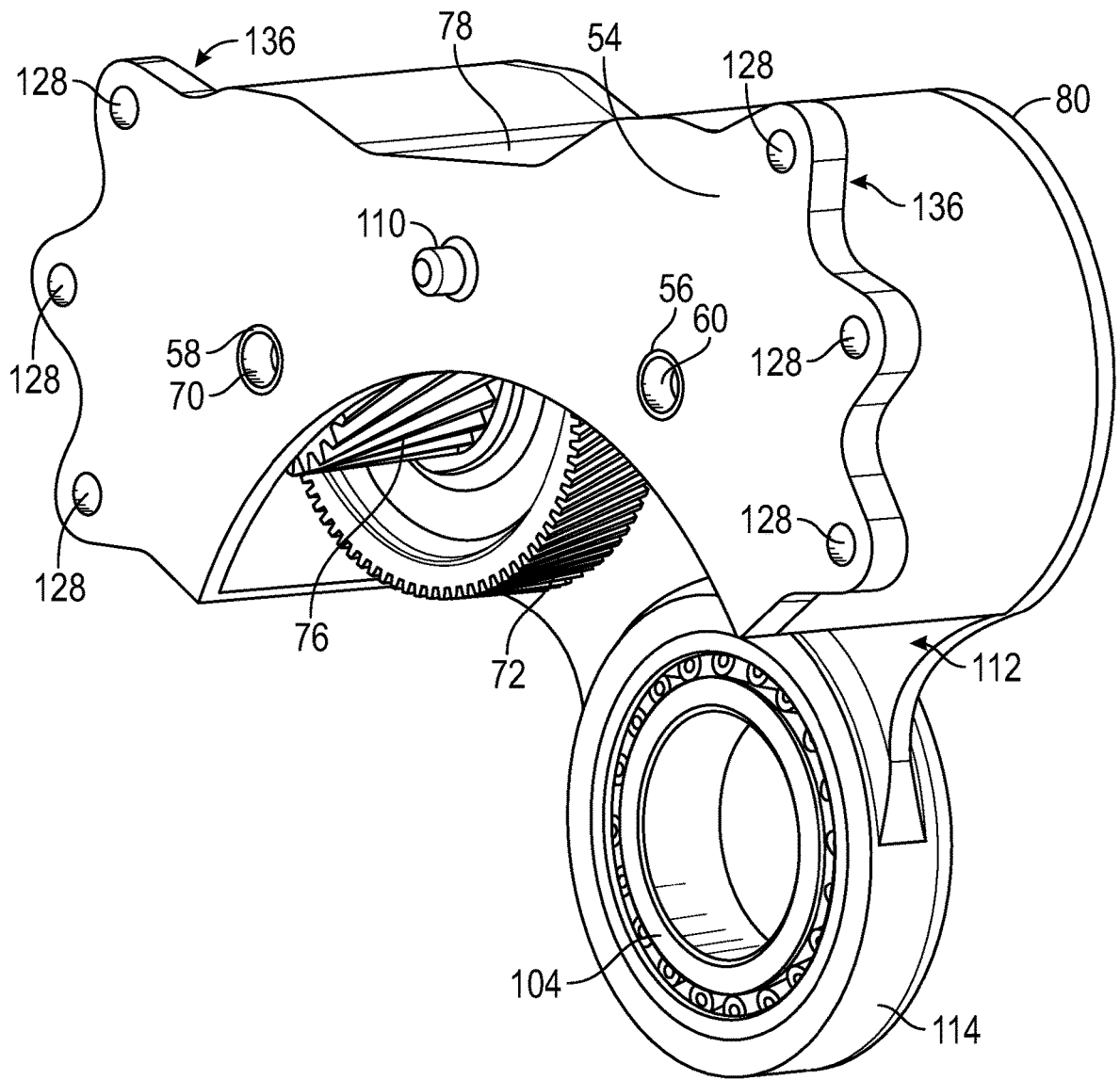
FIG. 7 is a front perspective view showing a carrier according to a number of variations.

A number of variations are illustrated in FIG. 7, which may include a first face 54 which may have at least a first extension portion 136 extending beyond the cover 78. The extension portion 136 may have a plurality of bolt holes 138 formed therein for Locating the carrier 52 and securing the carrier 52 to a case structure with bolts, not shown, to react any unbalanced loads. A locating feature 110, which may be an elongated protrusion extending generally perpendicularly from the first face 54, may be provided to locate the carrier 52 to a case structure.

Figure 9:
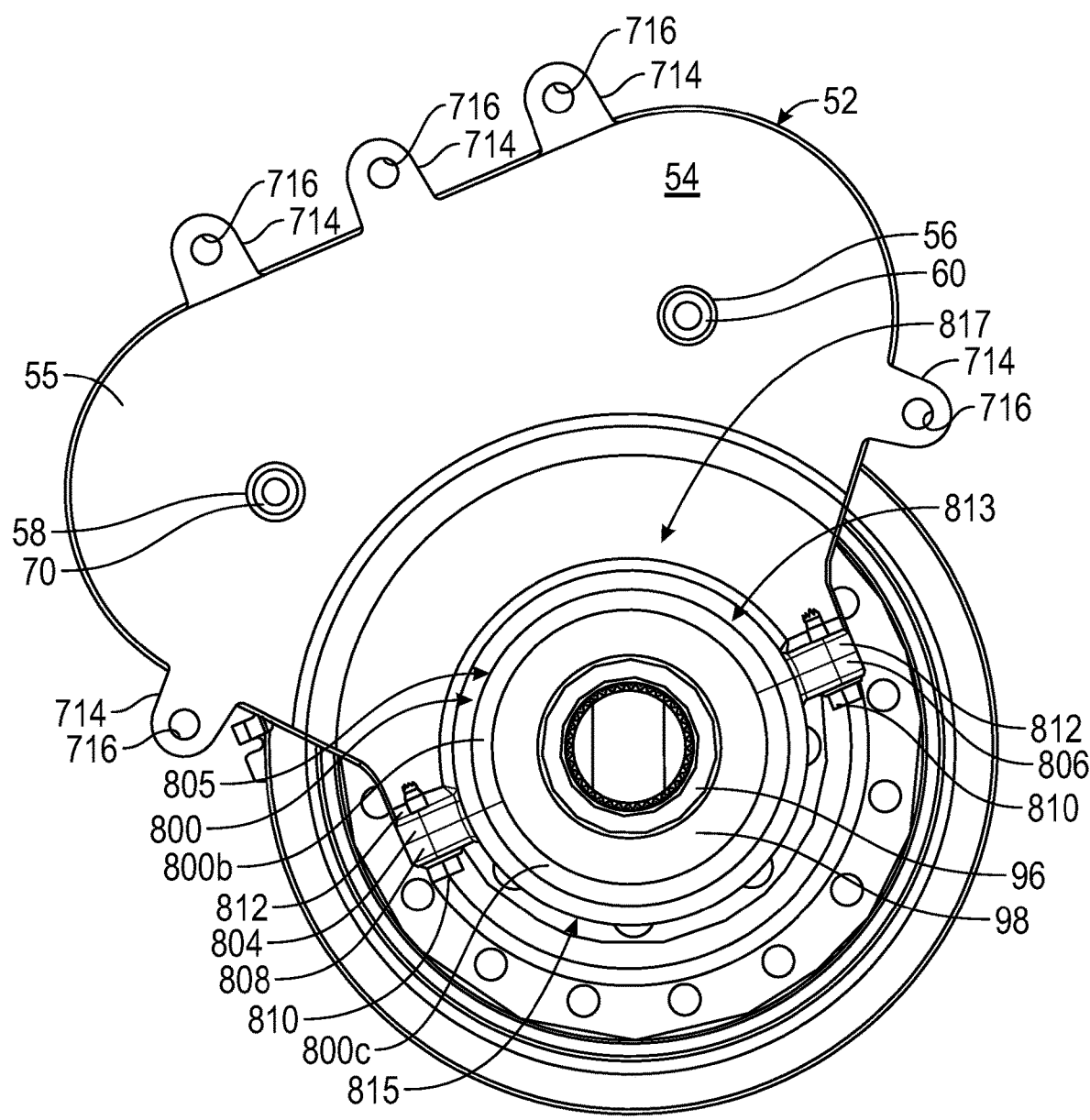
FIG. 9 is a rear view showing a carrier showing a third bearing cap according to a number of variations.
Figure 10:
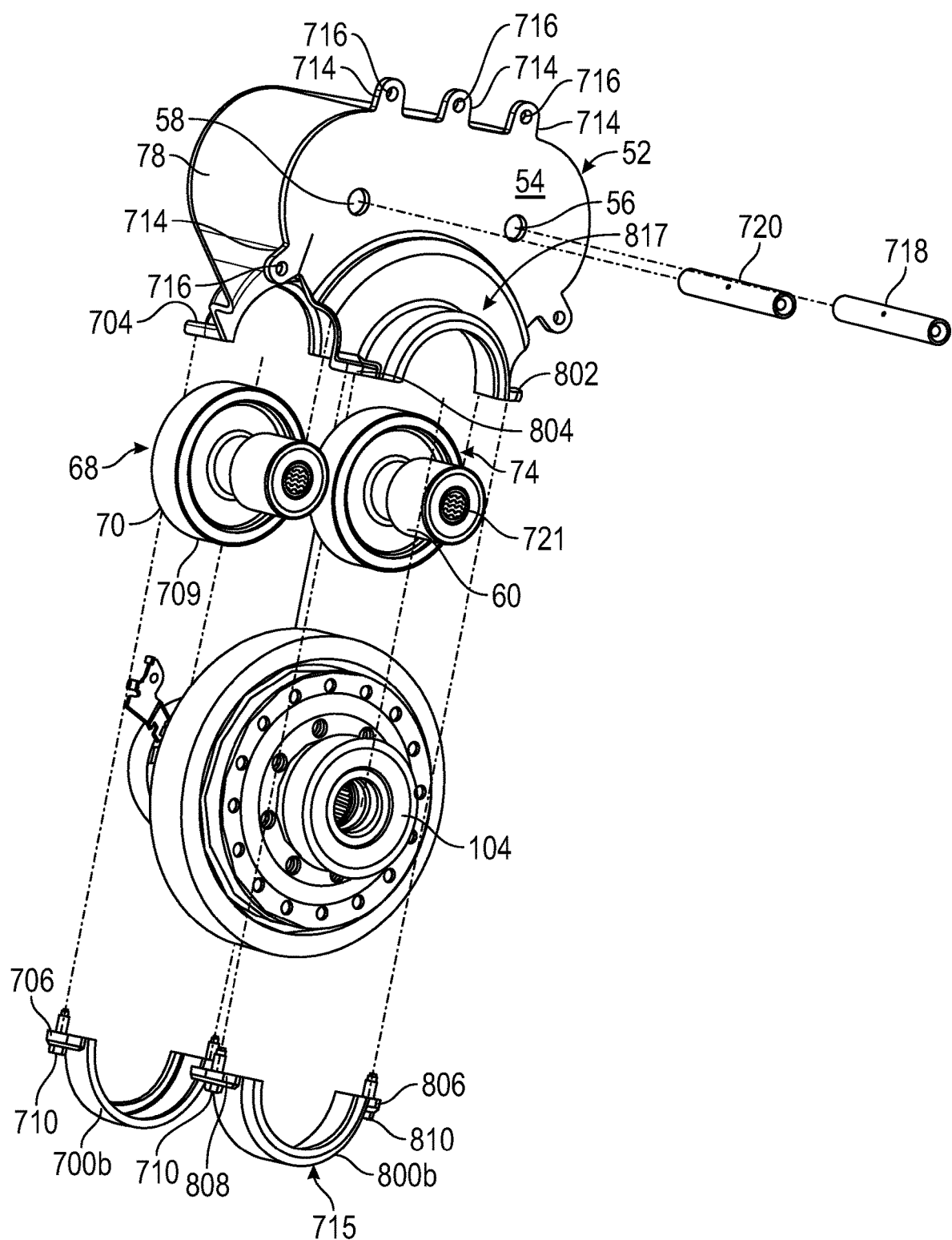
FIG. 10 is a exploded, perspective view showing a carrier showing at least one bearing cap according to a number of variations.

A number of variations are illustrated in FIGS. 8, 9, and 10. A number of variations are illustrated in FIG. 8 which may include one of more bearing caps 700, 703, 817, which may include a first bearing cap 700, which may include a first protrusion 701 extending from a flat portion 81 of the second face 80 of the carrier 52. The first protrusion 701 may be stamped out of the second face 80. In a number of variations, the first protrusion 701 may be a single piece annular portion 700a defining in opening for receiving the input shaft 90 (shown for example in FIGS. 3A-3B). The first bearing cap 700 may be constructed and arranged to receive and retain the input shaft bearing 102.

A second bearing cap 703 may be provided. The second bearing cap 703 may include two portions 713 and 715, wherein the first portion 713 may include a second protrusion 705 extending from the flat surface 81 of the second face 80 of the carrier 52. The second protrusion 705 may be stamped out of the second face 80 or attached thereto. In a number of variations, the second protrusion 705 may have a first arcuate shaped portion 700b and a first mounting flange 702 extending from a first end of the first arcuate shaped portion 700b and a second mounting flange 704 from a second end of the first arcuate shaped portion 700b. A second portion 715 of the second bearing cap 703 may include a second arcuate shaped portion 700c. A first mounting flange 706 extending from a first end of the second arcuate shaped portion 700c and a second mounting flange 708 from a second end of the second arcuate shaped portion 700c. The mounting flanges 702, 704, 706, 708, may have a through hole formed in each, and the bolt 710 may extend though the through hole and held in place by a nut 712 to mount the first portion 713 and the second portion 715 of the second bearing cap 703 together. The second bearing cap 703 may be constructed and arranged to receive and retain the second output shaft bearing 104.

In a number of variations, for as illustrated in FIG. 9, a third bearing cap 817 may be provided. The third bearing cap 817 may include two portions 813 and 815, wherein the first portion 813 may include a third protrusion 805 extending from the flat surface 55 of the first face 54 of the carrier 52. The third protrusion 805 may be stamped out of the first face 54. The third protrusion 805 may be stamped out of the first face 54 or attached thereto. In a number of variations, the second protrusion 805 may have a first arcuate shaped portion 800*b* and a first mounting flange 802 extending from a first end of the first arcuate shaped portion 800*b* and a second mounting flange 804 from a second end of the first arcuate shaped portion 800*b*. The second portion 815 of the second bearing cap 817 may include a second arcuate shaped portion 800*c*. A first mounting flange 806 extending from a first end of the second arcuate shaped portion 800*c* and a second mounting flange 808 from a second end of the second arcuate shaped portion 800*c*. The mounting flanges 802, 804, 806, 808, may have a through hole formed in each, and the bolt 810 may extend though through hole and held in place by a nut 812 to mount the first portion 813 and the second portion 815 of the second bearing cap 817 together. The third bearing cap 813 may be constructed and arranged to receive and retain a first output shaft annular 98 bearing.

Referring to FIG. 10, in a number of variations, a first pin 718 may extend through the first through hole 56 in the first face 54 of the carrier 52 and may be received in a bearing 721 that may be received in the inner diameter of the first transfer gear shaft 60. A second pin 720 may extend through the second through hole 58 in the first face 54 of the carrier 52 and may be received in a bearing 719 that may be received in the inner diameter of the second transfer gear shaft 70. The first face 54, the second face 80 of the cover 78 may include a plurality of mounting flanges 714 with each have a through hole formed therein for mount the first face 54, second face 80, and cover 78 to each other, or to another structure of a vehicle.

While at least one illustrative variation has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A product, comprising:
   a gear piloting carrier for use in an electric drive unit of a vehicle;
   a carrier disposed within a case structure;
   the carrier comprising a cover and at least one face extending from the cover, the cover and at least one face receiving a first transfer gear mounted to or formed on a first transfer gear shaft and a second transfer gear mounted to or formed on a second transfer gear shaft, and the cover and at least one face enclosing at least a portion of the first transfer gear mounted to or formed on the first transfer gear shaft and the second transfer gear mounted to or formed on the second transfer gear shaft, the at least one face having at least one plurality of piloting feature features to pilot the first transfer gear shaft and the second transfer gear shaft into position with respect to the carrier and each other, wherein the carrier includes a feature for engaging the case structure to react to unbalanced loads.

2. A product as set forth in claim 1 wherein the at least one face having a plurality of piloting features comprises a first face of the carrier having a first through hole formed in the first face and a second through hole formed in the first face, wherein the first through hole formed in the first face is spaced apart from the second through hole formed in the first face, wherein the first through hole formed in the first face is configured to receive the first transfer gear shaft, and wherein the second through hole formed in the first face is configured to receive the second transfer gear shaft.

3. A product as set forth in claim 2 wherein the at least one face having a plurality of piloting features further comprises a second face of the carrier extending from the cover, wherein a first through hole is formed in the second face and a second through hole is formed in the second face, wherein the first through hole formed in the second face is spaced apart from the second through hole formed in the second face, wherein the first through hole formed in the second face is configured to receive the first transfer gear shaft, and wherein the second through hole formed in the second face is configured to receive the second transfer gear shaft.

4. A product as set forth in claim 3 wherein a first imaginary axis extending through the first through hole formed in the first face and through the first through hole formed in the second face, and a second imaginary axis extending through the first through hole formed in the second face and through the second through hole formed in the second face are parallel and in the same plane.

5. The product as set forth in claim 3 wherein the at least one face and the cover of the carrier are constructed and arranged to at least partially enclose or cover a pinion gear mounted to or formed on an input drive shaft, wherein the second face includes a third through hole formed therein constructed and arranged to receive the input drive shaft.

6. A product as set forth in claim 3 further including at least one bearing cap comprising a protrusion extending for a flat portion of the first face or the second face of the carrier, wherein the protrusion includes an annular portion of an arcuate shaped portion, wherein the at least one bearing cap is constructed and arranged to receive and retain an input shaft bearing, a first output shaft bearing, or a second output shaft bearing.

7. A product as set forth in claim 6 wherein the carrier further comprises a baffle constructed and arranged to receive and enclose or cover at least at portion of a final drive gear, wherein the baffle comprises a second mount plate portion overlying at least a portion of the first mounting plate portion and attached, mounted, bolted or welded to at least one of the at least one face or the annular output shaft bearing support.

8. A product as set forth in claim 5 further comprising an input shaft bearing received in the third through hole formed in the second face.

9. A product as set forth in claim 1 wherein the feature for engaging the case structure comprises at least one spline having a plurality of space apart teeth for engaging the case structure.

10. A product as set forth in claim 1 wherein the feature for engaging a case structure comprises at least one elongated protrusion extending from the least one face.

11. A product as set forth in claim 1 wherein the carrier includes an annular output shaft bearing support constructed and arranged to receive an output drive shaft bearing and support an output drive shaft.

12. A product as set forth in claim 11 further comprising an output shaft bearing received in the annular output shaft bearing support.

13. A product as set forth in claim 11 wherein the at least one face includes an extension portion including the annular output shaft bearing support.

14. A product as set forth in claim 1 wherein the carrier comprises a baffle constructed and arranged to receive and enclose or cover at least a portion of a final drive gear.

15. A product as set forth in claim 14 wherein the baffle comprises a second mount plate portion attached, mounted, bolted, or welded to the at least one face.

16. A product comprising:
a gear piloting carrier for use in an electric drive unit of a vehicle;
the carrier comprising a cover and at least one face extending from the cover, the cover and at least one face being constructed and arranged to receive a first transfer gear mounted to or formed on a first transfer gear shaft and a second transfer gear mounted to or formed on a second transfer gear shaft, and wherein the cover and at least one face are constructed and arranged to enclose or cover at least a portion of the first transfer gear mounted to or formed on the first transfer gear shaft and the second transfer gear mounted to or formed on the second transfer gear shaft, the at least one face have at least one piloting feature to pilot the first transfer gear shaft and second transfer gear shaft into position with respect to the carrier and each other;
wherein the at least one face having at least one piloting feature comprises a first face of the carrier having a first through hole formed in the first face and a second through hole formed in the first face, wherein the first through hole formed in the first face is spaced apart from the second through hole formed in the first face, wherein the first through hole formed in the first face is configured to receive the first transfer gear shaft, and wherein the second through hole formed in the first face is configured to receive the second transfer gear shaft;
wherein the at least one face having at least one piloting feature further comprises a second face of the carrier extending from the cover, wherein a first through hole is formed in the second face and a second through hole is formed in the second face, wherein the first through hole formed in the second face is spaced apart from the second through hole formed in the second face, wherein the first through hole formed in the second face is configured to receive the first transfer gear shaft, and wherein the second through hole formed in the second face is configured to receive the second transfer gear shaft;
wherein the at least one face and the cover of the carrier are constructed and arranged to at least partially enclose or cover a pinion gear mounted to or formed on an input drive shaft, wherein the second face includes a third through hole formed therein constructed and arranged to receive the input drive shaft;
wherein the carrier includes a feature for engaging a case structure constructed and arranged to react to unbalanced loads;
wherein the carrier includes an annular output shaft bearing support constructed and arranged to receive an output drive shaft bearing and support an output drive shaft;
the first transfer gear shaft inserted into the first through hole formed in the first face and wherein the first transfer gear is mounted to or formed on the first transfer gear shaft,
the second transfer gear shaft inserted into the second through hole formed in the first face and wherein the second transfer gear is mounted to or formed on the second transfer gear shaft; and
the output drive shaft bearing received in the annular output shaft bearing support and the output drive shaft received in the annular output shaft bearing, the output drive shaft having a final drive gear mounted to or formed thereon and so that the final drive gear meshes with the first transfer gear and the second transfer gear.

17. A method comprising:
providing a gear piloting carrier for use in an electric drive unit of a vehicle, wherein the carrier comprises a cover and at least one face extending from the cover, the cover and at least one face being construction and arranged to receive a first transfer gear mounted to or formed on a first transfer gear shaft and a second transfer gear mounted to or formed on a second transfer gear shaft, and wherein the cover and at least one face are constructed and arranged to enclose or cover at least a portion of the first transfer gear mounted to or formed on the first transfer gear shaft and the second transfer gear mounted to or formed on the second transfer gear shaft, the at least one face having at least one piloting feature to pilot the first transfer gear shaft and second transfer gear shaft into position with respect to the carrier and each other,
wherein the at least one face having at least one piloting feature comprises a first face of the carrier have a first through hole formed in the first face and a second through hole formed in the first face, wherein the first through hole formed in the first face is spaced apart from the second through hole formed in the first face, wherein the first through hole formed in the first face is configured to receive the first transfer gear shaft, and wherein the second through hole formed in the first face is configured to receive the second transfer gear shaft,
inserting the first transfer gear shaft into the first through hole formed in the first face and wherein the first transfer gear is mounted to or formed on the first transfer gear shaft,
inserting the second transfer gear shaft into the second through hole formed in the first face and wherein the second transfer gear is mounted to or formed on the second transfer gear shaft; and
inserting an input shaft into a third through hole formed in the first face, the input shaft having a pinion gear mounted to or formed thereon and so that the pinion gear meshes with the first transfer gear and the second transfer gear.

18. A method as set forth in claim 17 wherein the at least one face having at least one piloting feature further comprises a second face of the carrier extending from the cover portion, wherein a first through hole is formed in the second face and a second through hole is formed in the second face, and wherein the first through hole formed in the second face is spaced apart from the second through hole formed in the second face, and further comprising:
inserting the first transfer gear shaft into the first through hole formed in the second face, and
inserting the second transfer gear shaft into the second through hole formed in the first face.

19. A method as set forth in claim 18 wherein the second face includes a third through hole formed therein and the method further comprising inserting the input shaft into the third through hole formed in the second face.

* * * * *